United States Patent
Kim

(10) Patent No.: US 8,903,621 B2
(45) Date of Patent: Dec. 2, 2014

(54) METHOD AND SYSTEM FOR CONTROLLING BRAKING OF VEHICLE

(71) Applicant: Hyundai Motor Company, Seoul (KR)

(72) Inventor: In Su Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 48 days.

(21) Appl. No.: 13/860,889

(22) Filed: Apr. 11, 2013

(65) Prior Publication Data

US 2014/0163833 A1    Jun. 12, 2014

(30) Foreign Application Priority Data

Dec. 7, 2012    (KR) .................... 10-2012-0141574

(51) Int. Cl.
G06F 7/70 (2006.01)
G06F 19/00 (2011.01)
G06G 7/00 (2006.01)
B60L 7/26 (2006.01)

(52) U.S. Cl.
CPC .............. *B60L 7/26* (2013.01); *B60L 2250/26* (2013.01); *B60L 2240/423* (2013.01)
USPC ........................................................ 701/70

(58) Field of Classification Search
CPC ..... B60W 10/08; B60W 20/00; B60W 20/40; B60W 20/108; B60W 30/18109; Y10S 903/902; Y02T 10/642; B60L 2240/423; B60L 2250/26
USPC ........................................................ 701/70
See application file for complete search history.

(56) References Cited

U.S. PATENT DOCUMENTS

| 4,235,320 | A  | * | 11/1980 | Polak et al. | 192/3.34 |
| 5,853,229 | A  | * | 12/1998 | Willmann et al. | 303/3 |
| 8,066,339 | B2 | * | 11/2011 | Crombez et al. | 303/152 |
| 8,123,310 | B2 | * | 2/2012  | Haupt et al. | 303/152 |
| 8,311,718 | B2 | * | 11/2012 | Jess et al. | 701/71 |
| 8,504,269 | B2 | * | 8/2013  | Goto et al. | 701/70 |
| 2006/0163942 | A1 | * | 7/2006 | Tsunehara et al. | 303/155 |
| 2008/0093179 | A1 | * | 4/2008 | Jager et al. | 188/72.2 |
| 2008/0228368 | A1 | * | 9/2008 | Fuhrer et al. | 701/81 |

FOREIGN PATENT DOCUMENTS

| JP | 2009274487 A | 11/2009 |
| JP | 2010-200590 A | 9/2010 |
| JP | 2012030731 A | 2/2012 |
| JP | 2012116425 A | 6/2012 |

* cited by examiner

*Primary Examiner* — Mary Cheung
*Assistant Examiner* — Frederick Brushaber
(74) *Attorney, Agent, or Firm* — Edwards Wildman Palmer LLP; Peter F. Corless

(57) ABSTRACT

Disclosed is a system and method for controlling braking of a vehicle equipped with an electronic wedge brake on a driving wheel thereof that receives a torque of a driving motor. The method includes obtaining a driver request to decelerate when a driver engages a brake pedal. A regenerative braking torque, a frictional braking torque of the driving wheel, and a friction braking torque of a coupled driving wheel are obtained from the request in a regenerative braking entrance state. An allowable frictional braking torque is obtained from wheel speed data, and is compared with the frictional braking torque. A compensation frictional braking torque is calculated from the friction braking torque and the allowable frictional braking torque when the frictional braking torque is greater than the allowable frictional braking torque. Braking control of the coupled driving wheel is performed using a torque as a final target torque.

14 Claims, 5 Drawing Sheets

METHOD AND SYSTEM FOR CONTROLLING BRAKING OF VEHICLE

CROSS-REFERENCE TO RELATED APPLICATION

This application claims under 35 U.S.C. §119(a) the benefit of Korean Patent Application No. 10-2012-0141574 filed Dec. 7, 2012, the entire contents of which are incorporated herein by reference.

BACKGROUND (a) Technical Field

The present invention relates to a method and system for controlling braking of a vehicle. More particularly, the present invention relates to a method and system for controlling braking of a vehicle, which stores regenerative braking energy in an eco-friendly vehicle equipped with an electric wedge brake on a driving wheel which receives power from a driving motor.

(b) Background Art

Generally, vehicles driven using an electric motor, i.e., eco-friendly vehicles such as pure Electric Vehicles (EV), Hybrid Electric Vehicles (HEV), and Fuel Cell Electric Vehicles (FCEV), perform regenerative braking upon braking of vehicles.

Regenerative braking systems of eco-friendly vehicles improve the fuel efficiency by converting kinetic energy of a vehicle into electric energy during braking of a vehicle, storing the electric energy in a battery, and recycling the electric energy to drive an electric motor when a vehicle drives.

In vehicles in which the regenerative braking is performed, a generative braking cooperative control technology is needed to allow the sum of a regenerative braking torque generated in an electric motor (e.g., driving motor) and a frictional braking torque generated in a brake to comply with a driver request braking torque.

In particular, an electric braking force by generative operation and rotation resistance of a motor, i.e., a regenerative braking force and a frictional braking force by a frictional braking device must be distributed. For this, cooperative control between controllers must be performed.

FIG. 1 shows an exemplary view illustrating distribution of a frictional braking torque and a regenerative braking torque to comply with a driver request braking torque. When a driver engages a brake pedal, the driver request deceleration D is determined using information such as a braking input value (e.g., detection value of brake pedal sensor) and a wheel speed based on the driver pedal operation, and the regenerative braking torque and the frictional braking torque are determined from the driver request deceleration D to comply with the driver request braking torque.

In other words, the regenerative braking torque and the frictional braking torque are distributed to comply with the driver request braking torque as shown in FIG. 1 (e.g., a target torque for control is distributed and determined), and regenerative braking control and the brake control are performed to generate distributed torques.

Moreover, to improve the regenerative braking cooperative control performance of a regenerative braking system, an Electro-Mechanical Brake (EMB) that enables individual control of the frictional braking torques of each wheel and is known to exhibit increased control performance.

The EMB is a brake that generates a braking force using an electric motor as a power source. Since the EMB does not use the hydraulic pressure to generate the braking force, the configuration is less complex than the configuration of a hydraulic brake. In addition, the EMB may improve the response and performance of various electronic control systems such as Anti Brake Systems (ABS) and the Unified Chassis Control (UCC). In the EMB, an operation of pressurizing a frictional pad to cause the frictional pad to rub with the disc is performed. In particular, the EMB receives a driver braking intention through the brake pedal, and controls the braking force of the wheel by controlling the motor driving.

An Electronic Wedge Brake (EWB) as an example of the EMB uses regenerative energy from a wedge assembly that is operated by an actuator upon braking. The EWB may implement a greater braking force than when a motor is used. As the wedge is moved by the driving of the actuator to pressurize the frictional pad, the action of the wedge may operate as an additional input of a frictional force between the frictional pad and the disc, generating a greater braking force.

FIG. 2 shows an exemplary view illustrating an electronic wedge brake 5 applied to a front wheel (e.g., driving wheel) to generate a substantially large braking torque and a typical electronic brake (wedge not used) 6 applied to a rear wheel (e.g., coupled driving wheel). Under cooperative control of a brake controller 1 and a motor controller 2, braking is performed on a vehicle by a regenerative braking force of a driving motor 3 and a frictional braking force of electronic brakes 5 and 6 mounted on the front/rear wheels while generated power of the driving motor 3 is stored in a battery 4.

The above regenerative braking system has the following limitations.

When vehicle braking starts based on the driver brake pedal input, the vehicle braking passes through a transition section, as shown in FIG. 1, during a low-speed section before the vehicle stop, and enters a state where the vehicle is stopped only by frictional braking without regenerative braking.

During the transition section in a general regenerative braking logic upon braking, the regenerative braking torque is gradually reduced, and the frictional braking torque increases as much as the regenerative braking torque is reduced. After the transition section, the regenerative braking is stopped, and only the frictional braking force is generated until a vehicle is completely stopped. In particular, the regenerative braking torque starts to decrease in the lowest vehicle speed section to store a maximum amount of regenerative braking energy in the battery.

When the response of the brake is slow, i.e., the frictional braking torque increases at a substantially slow speed and requires a substantially long transition duration, the time point to begin reducing the regenerative braking torque is advanced despite the regenerative braking being possible. Accordingly, the amount of regenerative braking energy that is recovered is reduced (see line A of FIG. 1).

On the other hand, when the response of the brake is increased, i.e., the frictional braking torque can quickly increase during the short transition duration, the time point to being reducing the regenerative braking torque can be delayed, and thus much more regenerative braking energy can be obtained. Accordingly, fuel efficiency may improve (e.g., the recovery amount and storage amount of regenerative braking energy increase) (see line B of FIG. 1).

However, since the EWB uses the regenerative energy phenomenon, a small output of the actuator can generate a large braking force, but in the low-speed section, the regenerative energy is reduced, leading to a limitation in increasing the frictional braking torque.

Accordingly, when the driver request is difficult to comply with, frictional braking torque during the transition section (e.g., fail to satisfy the driver request frictional braking torque) may occur, the frictional braking torque may not be quickly increased due to the reduction of the regenerative energy, causing disadvantages in terms of the storage of the regenerative braking energy and the fuel efficiency.

The above information disclosed in this section is only for enhancement of understanding of the background of the invention and therefore it may contain information that does not form the prior art that is already known in this country to a person of ordinary skill in the art.

SUMMARY

The present invention provides a system and method for controlling braking of a vehicle, which may comply with a driver request braking torque (e.g., sum of regenerative braking torque and frictional braking torque) because the regenerative energy from an electronic wedge brake may be reduced during the transition section in which the regenerative braking torque is reduced and the frictional braking torque may be increased in eco-friendly vehicles (e.g., EV, HEV, and FCV) equipped with an electronic wedge brake on a driving wheel configured to receive power from a driving motor.

The present invention also provides a system and method for controlling braking, which may store an increased amount of regenerative braking energy in a vehicle equipped with an electronic wedge brake on a driving wheel thereof.

In one aspect, the present invention provides a system and method for controlling braking of a vehicle equipped with an electronic wedge brake on a driving wheel thereof receiving a torque of a driving motor, the method including: obtaining a driver request to decelerate when a driver engages a brake pedal to perform a braking input; obtaining a regenerative braking torque, a frictional braking torque of the driving wheel, and a friction braking torque of a coupled driving wheel from the driver request to decelerate in a regenerative braking entrance state; obtaining an allowable frictional braking torque of the driving wheel from wheel speed data of the driving wheel and then comparing the frictional braking torque of the driving wheel with the allowable frictional braking torque of the driving wheel; calculating a compensation frictional braking torque from the friction braking torque of the driving wheel and the allowable frictional braking torque of the driving wheel when the frictional braking torque of the driving wheel is greater than the allowable frictional braking torque of the driving wheel; and performing braking control of the coupled driving wheel using a torque as a final target torque, the torque being obtained by compensating for the frictional braking torque of the coupled driving wheel using the compensation frictional braking torque.

In an exemplary embodiment, in the performing of the braking control of the coupled driving wheel, control of an electronic wedge brake may be performed on the driving wheel using the allowable frictional braking torque of the driving wheel as a final target torque.

In another exemplary embodiment, in calculating of the compensation frictional braking torque, the compensation frictional braking torque may be obtained from a difference between the frictional braking torque of the driving wheel and the allowable friction braking torque of the driving wheel.

In still another exemplary embodiment, in the performing of the braking control of the coupled driving wheel, the final target frictional braking torque of the coupled driving wheel may be calculated as the sum of the frictional braking torque of the coupled driving wheel and the compensation frictional braking torque.

In yet another exemplary embodiment, the allowable frictional braking torque of the driving wheel may be obtained from a map in which the allowable frictional braking torques of the driving wheel are defined according to the wheel speed data of the driving wheel.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
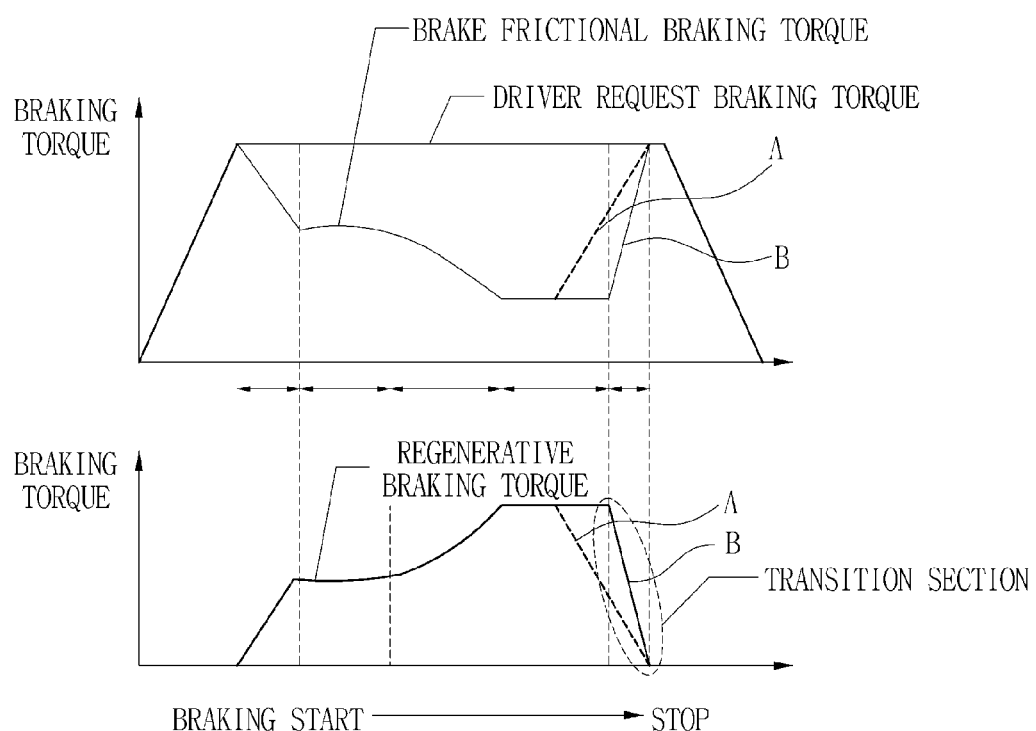
FIG. 1 is an exemplary view illustrating distribution of a frictional braking torque and a regenerative braking torque to comply with a driver request braking torque according to the related art.

Reference numerals set forth in the Drawings includes reference to the following elements as further discussed below:

| 1: brake controller | 2: motor controller |
|---|---|
| 3: driving motor | 4: battery |
| 5: electronic wedge brake | 6: typical electro-mechanical brake |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings so that those skilled in the art can easily carry out the present invention.

The present invention relates to a system and method for controlling braking of a vehicle, which may store an increased amount of regenerative braking energy in a vehicle equipped with an electronic wedge brake on a driving wheel receiving power from a driving motor.

The present invention provides a system and a method of compensating for a frictional braking torque using frictional braking of a typical electronic brake mounted on a coupled driving wheel (rear wheel FIG. 2) to satisfy the driver request frictional braking torque which may not be satisfied in the related art due to a reduction of regenerative energy in the electronic wedge brake of a driving wheel (front wheel of FIG. 2) during a transition section in which the regenerative braking torque is reduced and the frictional braking torque is increased.

Figure 3:
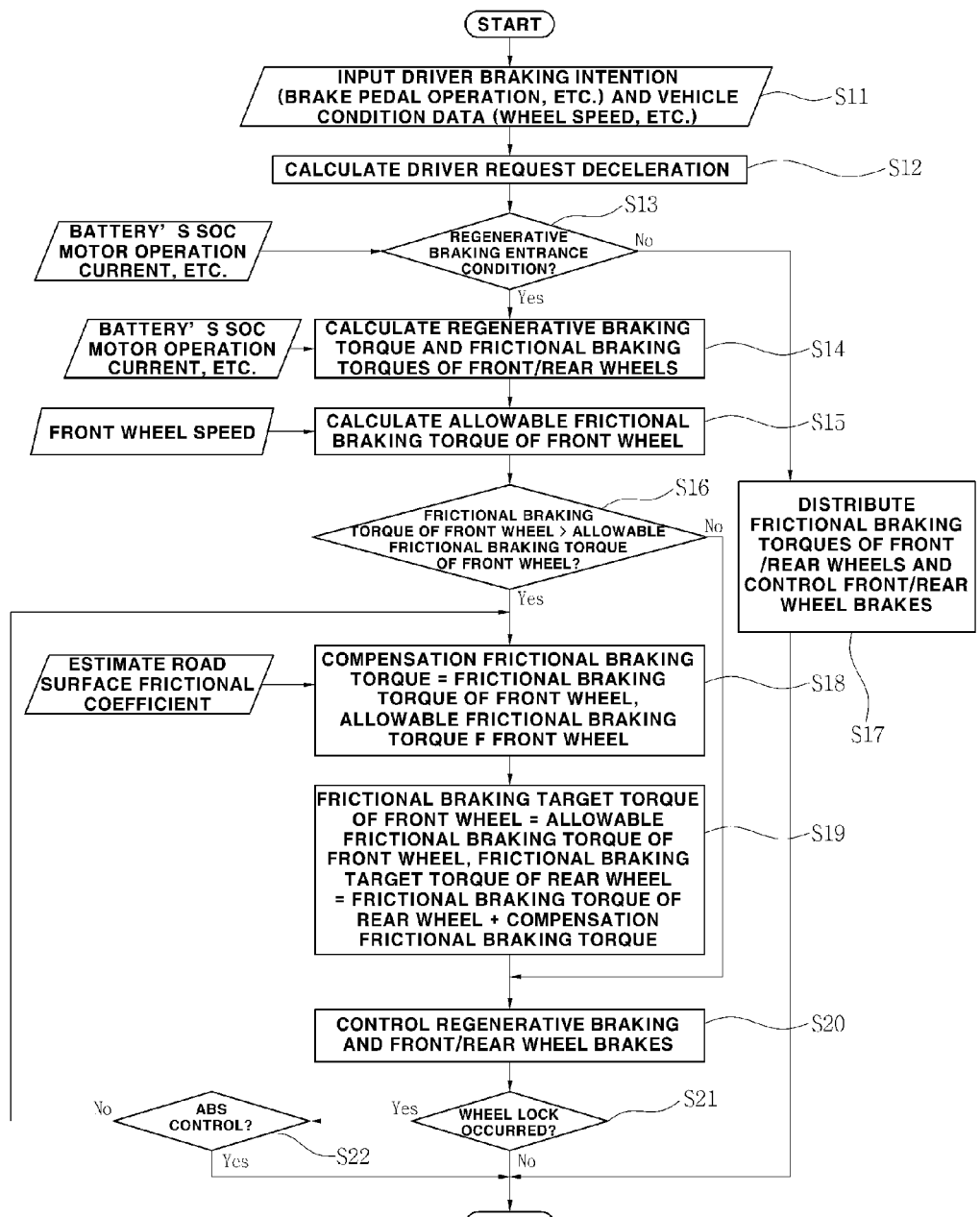
FIG. 3 is an exemplary flowchart illustrating a method for controlling braking of a vehicle equipped with an electronic wedge brake according to an exemplary embodiment of the present invention.

FIG. 3 is an exemplary flowchart illustrating a method for controlling braking of a vehicle equipped with an electronic wedge brake according to an exemplary embodiment of the present invention.

Figure 2:
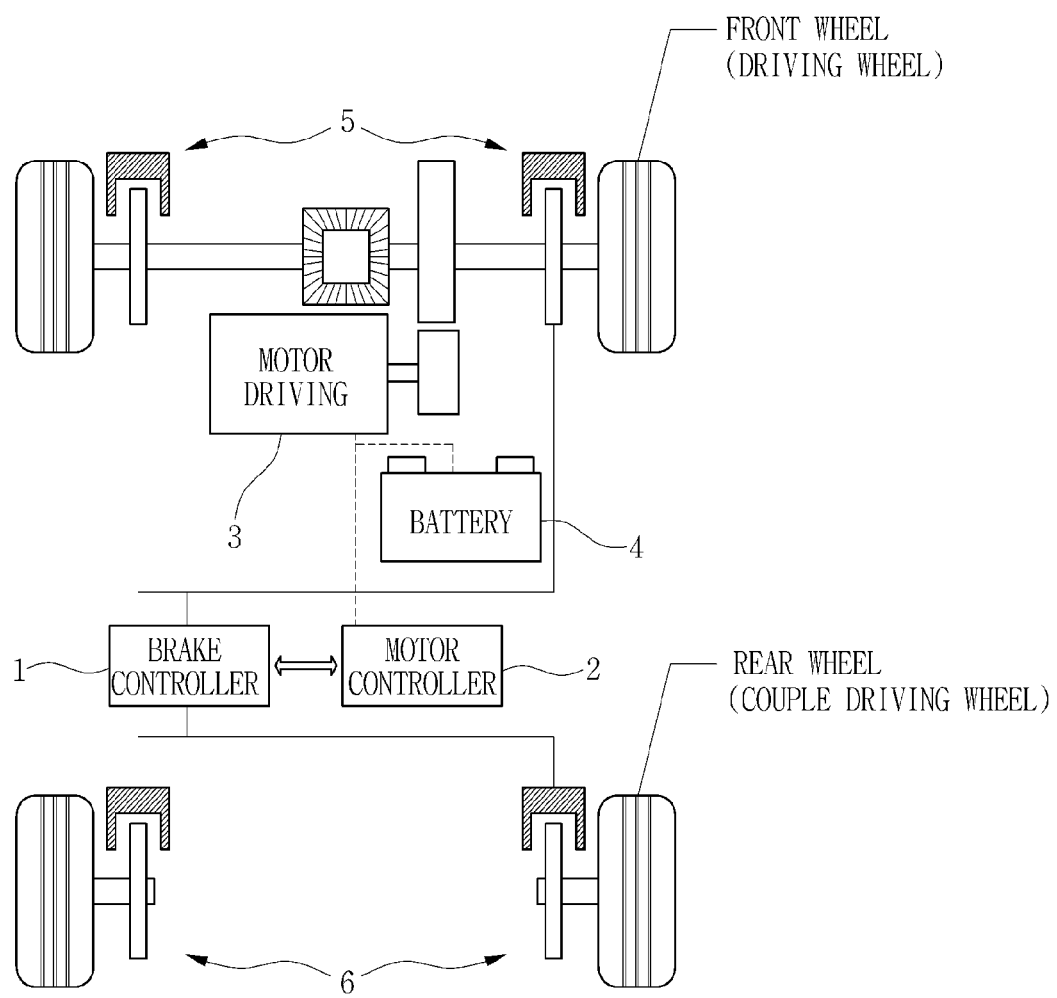
FIG. 2 is an exemplary view illustrating an electronic wedge brake applied to a front wheel to generate a substantially large braking torque and a typical electronic brake applied to a rear wheel according to the related art.

Hereinafter, a vehicle in which a driving wheel connected to a driving motor is a front wheel equipped with an electronic wedge brake and a coupled driving wheel is a rear wheel equipped with a typical electronic brake will be exemplified (see FIG. 2).

In particular, for a vehicle in which the rear wheel receives a torque of the driving motor, since the rear wheel becomes the driving wheel, and the front wheel becomes the coupled driving wheel, the front wheel and the rear wheel will be switched in the following description.

First, when a driver braking intention is input (S11), (i.e., a driver engages the brake pedal to perform braking), a controller may be configured to determine a driver request to decelerate D using information such as a braking input value (e.g., detection value of a brake pedal sensor) and vehicle condition data (e.g., wheel speed detected by the sensor) (S12).

The driver request to decelerate D may be a control variable used upon braking control of a vehicle and the calculation method and process thereof is well known. Accordingly, the calculation method and process of the driver request to decelerate will not be limited to a specific type in an embodiment of the present invention, and a detailed description thereof will be omitted herein. For example, a well-known method calculates the driver request braking deceleration D from information of an engagement quantity (e.g., stroke quantity) or an engagement force (e.g., pressure) of a brake pedal, or using information such as wheel speed in addition thereto.

When the driver request to decelerate is calculated, the motor controller may be configured to determine from battery condition information (e.g., State of Charge (SOC)) delivered from a battery controller and vehicle condition information such as a motor operation current delivered from a motor controller whether a current vehicle condition corresponds to a regenerative braking entrance condition (S13).

Specifically, when the regenerative braking entrance condition is not satisfied, the vehicle braking may be performed by the brake controller, through distribution of the frictional braking force of the front wheel (e.g., driving wheel) and the rear wheel (e.g., coupled driving wheel) without regenerative braking (S17), and the frictional braking torque required in the front and rear wheels may be obtained by the motor controller upon obtaining the driver request to decelerate without the regenerative braking torque.

In particular, since the regenerative braking is not performed, the braking control of the front and rear wheels may be performed, by the brake controller, by distributing the frictional braking torque (e.g., control target value) from the front and rear wheels when only the frictional braking force is used (e.g., driver request braking torque is equal to frictional braking torque from front wheel and frictional braking torque from rear wheel).

Moreover, when the regenerative braking entrance condition is satisfied, the regenerative braking torque and the frictional braking torque from the front and rear wheels for complying with the driver request braking torque may be calculated, by the motor controller, upon obtaining the driver request to decelerate (S14). In particular, a process of obtaining the frictional braking torque from the front wheel and the frictional braking torque from the rear wheel based on the regenerative braking torque may be similar to a typical process of the related art. For example, the regenerative braking torque, the frictional braking torque from the front wheel, and the frictional braking torque from the rear wheel may be determined such that the sum of the regenerative braking torque, the frictional braking torque from the front wheel, and the frictional braking torque from the rear wheel is substantially equal to the driver request braking torque.

Furthermore, an allowable frictional braking torque from the front wheel may be obtained, by the motor controller, from the wheel speed information of the front wheel determined by the sensor (S15). The allowable frictional braking torque may be obtained from a map in which allowable frictional braking torques are predefined according to the wheel speed of the front wheel. In particular, a map created using data of preceding tests on the electronic wedge brake, for example, allowable torque data that may exert a frictional force by driving of an actuator among various wheels may be pre-stored in the motor controller.

Thus, when the allowable frictional braking torque is obtained from the wheel speed data from the front wheel, the frictional braking torque from the front wheel obtained in operation S14 may be compared, by the motor controller, with the allowable frictional braking torque from the front wheel (S16). In particular, when the frictional braking torque from the front wheel is equal to or less than the allowable frictional braking torque from the front wheel, the regenerative braking control and the front and rear wheel braking control may be performed, by the brake controller, using the regenerative braking torque and the frictional braking torque from the front and rear wheels (S20).

On the other hand, when the torque distribution value from the front wheel is greater than the allowable frictional braking torque from the front wheel, (i.e., the frictional braking torque from the front wheel obtained in operation S14 is greater than the allowable frictional braking torque from the front wheel obtained in operation S15), a compensation frictional braking torque may be calculated, by the motor controller, from the frictional braking torque from the front wheel and the allowable frictional braking torque of the front wheel (S18). In particular, the compensation frictional braking torque may be obtained from a difference between the frictional braking torque from the front wheel obtained in operation S14 and the allowable friction braking torque from the front wheel obtained in operation S15.

Thereafter, the frictional braking torque from the front wheel (e.g., final target torque for the control from the front wheel braking control) may be determined by the allowable frictional braking torque from the front wheel obtained from the front wheel speed data. Additionally, the frictional braking torque from the rear wheel (e.g., final target torque for the control of the rear wheel) may be determined by the sum of the frictional braking torque from the rear wheel obtained in operation S14 and the compensation frictional braking torque obtained in operation S18 (S19).

Furthermore, the brake controller may operate the regenerative braking using the regenerative braking torque and may operate the driving of the actuators of the front and rear wheel brakes using the frictional braking torque from the front and rear wheels that are determined in operation S19 (S20), allowing desired braking forces to be generated in the front and rear wheel brakes.

Thus, the driver request frictional braking torque (e.g., the sum of the frictional braking torque of the front wheel determined in operation S19 and the compensated frictional braking torque of the rear wheel) may be satisfied by compensating for the frictional braking torque (corresponding to the compensation frictional braking torque).

In the above control process, when a wheel lock occurrence condition (e.g., when the driver request to decelerate braking is greater than the vehicle deceleration in the current road surface frictional coefficient) is detected from an estimated road surface frictional coefficient, anti-lock braking system (ABS) control in which the regenerative braking is stopped and the vehicle braking is performed only using the frictional braking may be performed (this is similar to a related art) (S21 and S22). In particular, the frictional braking torque may increase to a range in which the wheel lock does not occur in the rear wheel.

Figure 4:
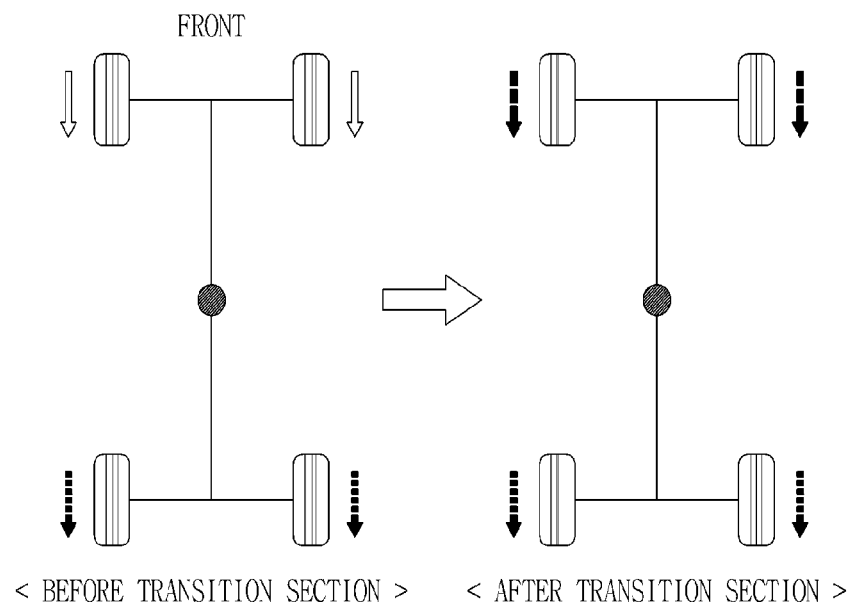
FIG. 4 is an exemplary view illustrating braking torque output states before and after a transition section upon braking of a vehicle according to an exemplary embodiment of the present invention.

FIG. 4 is an exemplary view illustrating braking torque output states before and after a transition section upon braking of a vehicle according to an exemplary embodiment of the present invention. Before the transition section, the braking of the front wheel (e.g., driving wheel) may be performed by the regenerative braking torque and the frictional braking torque from the front wheel, whereas the braking of the rear wheel may be performed by the frictional braking torque from the rear wheel. After the transition section, the regenerative braking of the front wheel may be stopped, and the braking of the front wheel may be performed only by the frictional braking torque similarly to the rear wheel.

Figure 5:
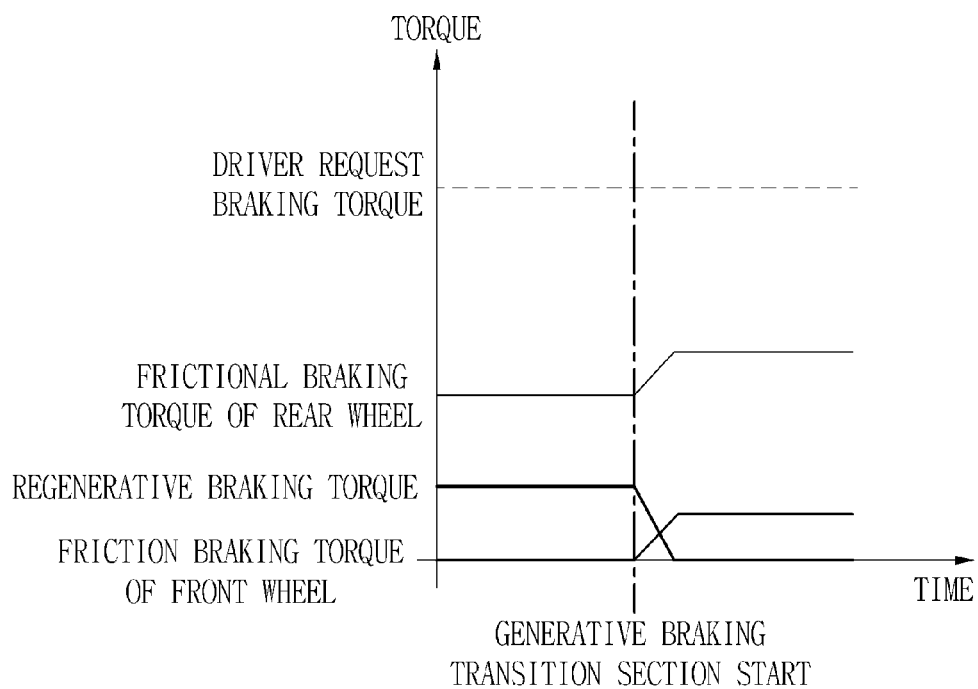
FIG. 5 is an exemplary graph illustrating changes of a regenerative braking torque and a frictional braking torque before and during a transition section according to an exemplary embodiment of the present invention.

FIG. 5 is an exemplary graph illustrating changes of a regenerative braking torque and a frictional braking torque before and during a transition section. The regenerative braking torque and the frictional braking torques may be determined such that the sum of the regenerative braking torque and the frictional braking torques of the front and rear wheels becomes substantially equal to the driver request braking torque.

Particularly, in the substantially low speed section in which a vehicle enters the transition section, the frictional braking torque from the rear wheel may be obtained by compensating for a frictional braking torque to rectify the amount that the electronic wedge brake cannot satisfy. In particular, a compensated target torque may be determined by adding the compensation frictional braking torque in operation S18 to the frictional braking torque from the rear wheel in operation S14 obtained from the driver request to decelerate after the entrance into the regenerative braking Thus, the driver request frictional braking torque may be satisfied by compensating for a friction braking torque using the frictional braking of a typical electro-mechanical brake.

Furthermore, the deficiency of the braking torque may be prevented, and simultaneously, the basic performance of the braking may be maintained, thereby improving the stability of a vehicle. Since a deficient amount of frictional braking of the electronic wedge brake in the substantially low speed section may be compensated by a typical electro-mechanical brake (instead of the wedge brake), the braking distance may be shortened. In addition, since the time point to start reducing the regenerative braking torque may be delayed in the substantially low speed section of a vehicle, the regenerative braking energy may be maximized.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A method for controlling braking of a vehicle equipped with an electronic wedge brake on a driving wheel that receives a torque of a driving motor comprising:
    obtaining, by a motor controller, a driver request to decelerate when a driver engages a brake pedal to perform a braking input;
    calculating, by the motor controller, a regenerative braking torque, a frictional braking torque from the driving wheel, and a friction braking torque from a coupled driving wheel when obtaining the driver request to decelerate during a regenerative braking entrance state;

calculating, by the motor controller, an allowable frictional braking torque of the driving wheel from wheel speed data of the driving wheel;

comparing, by the motor controller, the frictional braking torque of the driving wheel with the allowable frictional braking torque of the driving wheel;

calculating, by the motor controller, a compensation frictional braking torque from the friction braking torque of the driving wheel and the allowable frictional braking torque of the driving wheel when the frictional braking torque of the driving wheel is greater than the allowable frictional braking torque of the driving wheel; and performing, by a brake controller, braking control of the coupled driving wheel using a torque as a final target torque, the torque obtained by compensating for the frictional braking torque from the coupled driving wheel using the compensation frictional braking torque.

2. The method of claim 1, wherein performing of the braking control of the coupled driving wheel, further includes:

operating, by the brake controller, an electronic wedge brake on the driving wheel using the allowable frictional braking torque from the driving wheel as a final target torque.

3. The method of claim 1, wherein calculating of the compensation frictional braking torque, further includes:

calculating, by the motor controller, the compensation frictional braking torque from a difference between the frictional braking torque from the driving wheel and the allowable friction braking torque from the driving wheel.

4. The method of claim 1, wherein the performing of the braking control of the coupled driving wheel, further includes:

calculating, by the motor controller, the final target frictional braking torque from the coupled driving wheel as the sum of the frictional braking torque from the coupled driving wheel and the compensation frictional braking torque.

5. The method of claim 1, further comprising:

calculating, by the motor controller, the allowable frictional braking torque from the driving wheel from a map in which the allowable frictional braking torques from the driving wheel are defined based on the wheel speed data of the driving wheel.

6. A system for controlling braking of a vehicle, comprising:

a motor controller configured to:
obtain a driver request to decelerate when a driver engages a brake pedal to perform a braking input;
calculate a regenerative braking torque, a frictional braking torque from the driving wheel, and a friction braking torque from a coupled driving wheel from the driver request to decelerate in a regenerative braking entrance state;
calculate an allowable frictional braking torque of the driving wheel from wheel speed data of the driving wheel;
compare the frictional braking torque of the driving wheel with the allowable frictional braking torque from the driving wheel;
calculate a compensation frictional braking torque from the friction braking torque of the driving wheel and the allowable frictional braking torque of the driving wheel when the frictional braking torque from the driving wheel is greater than the allowable frictional braking torque from the driving wheel; and a brake controller configured to:
perform braking control of the coupled driving wheel using a torque as a final target torque, the torque obtained by compensating for the frictional braking torque from the coupled driving wheel using the compensation frictional braking torque.

7. The system of claim 6, wherein the brake controller is further configured to:

operate an electronic wedge brake on the driving wheel using the allowable frictional braking torque from the driving wheel as a final target torque.

8. The system of claim 6, wherein the motor controller is further configured to:

calculate the compensation frictional braking torque from a difference between the frictional braking torque from the driving wheel and the allowable friction braking torque from the driving wheel.

9. The system of claim 6, wherein the motor controller is further configured to:

calculate the final target frictional braking torque from the coupled driving wheel as the sum of the frictional braking torque from the coupled driving wheel and the compensation frictional braking torque.

10. The system of claim 6, wherein the motor controller is further configured to:

calculate the allowable frictional braking torque from the driving wheel from a map in which the allowable frictional braking torques from the driving wheel are defined based on the wheel speed data of the driving wheel.

11. A non-transitory computer readable medium containing program instructions executed by a processor or controller, the computer readable medium comprising:

program instructions that obtain a driver request to decelerate when a driver engages a brake pedal to perform a braking input;

program instructions that calculate a regenerative braking torque, a frictional braking torque from the driving wheel, and a friction braking torque from a coupled driving wheel from the driver request to decelerate in a regenerative braking entrance state;

program instructions that calculate an allowable frictional braking torque from the driving wheel from wheel speed data of the driving wheel;

program instructions that compare the frictional braking torque of the driving wheel with the allowable frictional braking torque of the driving wheel; and program instructions that calculate a compensation frictional braking torque from the friction braking torque of the driving wheel and the allowable frictional braking torque of the driving wheel when the frictional braking torque of the driving wheel is greater than the allowable frictional braking torque of the driving wheel, wherein the compensation frictional braking torque is used by a brake controller to perform braking control of the coupled driving wheel using a torque as a final target torque, the torque obtained by compensating for the frictional braking torque from the coupled driving wheel using the compensation frictional braking torque.

12. The non-transitory computer readable medium of claim 11, further comprising:

program instructions that calculate the compensation frictional braking torque from a difference between the frictional braking torque of the driving wheel and the allowable friction braking torque of the driving wheel.

13. The non-transitory computer readable medium of claim 11, further comprising:
   program instructions that calculate the final target frictional braking torque of the coupled driving wheel as the sum of the frictional braking torque of the coupled driving wheel and the compensation frictional braking torque.

14. The non-transitory computer readable medium of claim 11, further comprising:
   program instructions that calculate the allowable frictional braking torque of the driving wheel from a map in which the allowable frictional braking torques of the driving wheel are defined based on the wheel speed data of the driving wheel.

* * * * *